Sept. 17, 1968   YOSHIO MORIWAKE   3,402,021
FLUIDIZED PROCESS FOR PRODUCING CARBON DISULFIDE
Filed Nov. 30, 1964
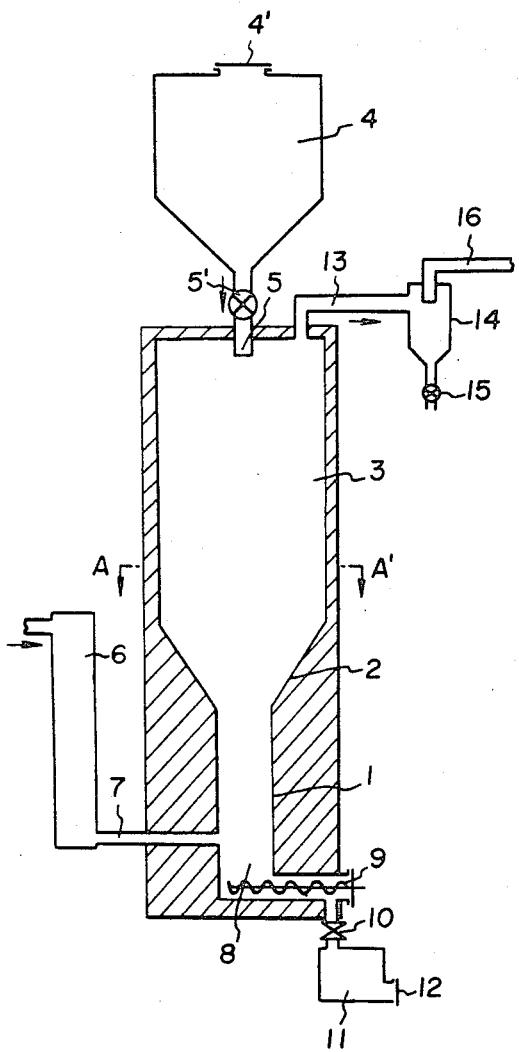
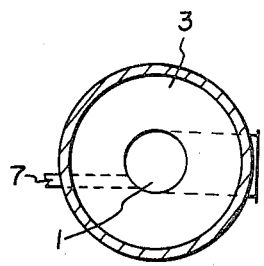
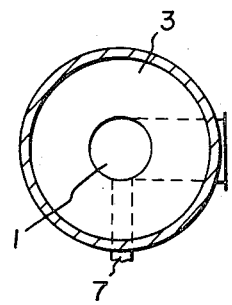
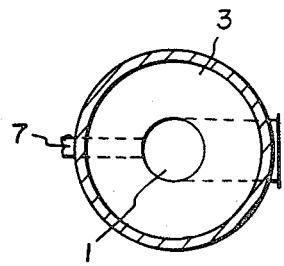
INVENTOR
Yoshio Moriwake
ATTORNEYS

United States Patent Office 3,402,021
Patented Sept. 17, 1968

3,402,021
FLUIDIZED PROCESS FOR PRODUCING CARBON DISULFIDE
Yoshio Moriwake, Waki-gun, Japan, assignor to Kurashiki Rayon Company Limited, Kurashiki, Japan, a corporation of Japan
Filed Nov. 30, 1964, Ser. No. 414,526
1 Claim. (Cl. 23—206)

ABSTRACT OF THE DISCLOSURE

A method of producing carbon disulfide wherein coarsely crushed charcoal is fed into the top of a reaction apparatus having an upper reaction chamber and a lower reaction chamber, the cross sectional area of said upper chamber being larger than that of the lower reaction chamber, and feeding sulfur as vapors to the lower part of the lower reaction chamber. The rate of feed of the reactants is regulated so as to form a fixed reaction bed in the upper reaction chamber and a fluidized reaction bed in the lower reaction chamber.

---

This invention relates to a method of producing carbon disulfide and an apparatus for carrying out the method, more particularly, to a method of continuous production of carbon disulfide from charcoal and gaseous sulfur, and the apparatus therefor.

The principal object of the invention is to provide a method of producing carbon disulfide continuously from charcoal and gaseous sulfur with better thermal efficiency and a simple apparatus for carrying out the method.

Another object of the invention is to provide a method of producing carbon disulfide having a very low sulfur content at a very high reaction rate of charcoal and sulfur by introducing the charcoal into a reaction apparatus from its top and gaseous sulfur from its lower part, and an effective apparatus for carrying out the invention.

A further object of the invention is to provide a method of and an apparatus for producing carbon disulfide wherein charcoal and sulfur are subjected to the fluidized bed reaction at the lower part of the reaction apparatus and then the fixed bed reaction at the upper fixed reaction zone.

The other object of the invention is to provide an apparatus for the production of carbon disulfide which is so arranged that the produced carbon disulfide is taken out from the upper part of the apparatus and ash is discharged from the lower part of said apparatus.

The invention will be more fully understood from the following description made with reference to the accompanying drawings, in which FIG. 1 is a diagrammatic sectional elevation of an apparatus for the production of carbon disulfide; and FIGS. 2 to 4 are diagrammatic sectional plan views taken on the line A–A' of FIG. 1 illustrating the direction of the gas inlet pipe and that of the outlet opening for taking out fine powders respectively when the reaction apparatus has cylindrical shape.

Referring to the drawing, the reaction apparatus for carrying out the invention consists of a circular cylindrical body lined with fire bricks to form therein a fluidizing bed 1 having a smaller cross section, a fixed reaction bed 3 having a larger cross section and a funnel-shaped intermediate portion 2 having a taper of 30 to 80 degrees, said portions 1, 2 and 3 being in open communication with each other without partitions between them. The cross sectional area of the fixed bed 3 is more than 3 times that of the fluidizing bed 1 and when both of these beds are cylindrical the intermediate portion for connecting them together has a truncated conical shape, whilst if both of said beds are formed of polygonal cylinders the intermediate portion consists preferably of a polygonal cone. The selection of the ratio of cross sectional area of the fixed bed 3 and that of the fluidized bed 1 as more than three times the latter is intended to effect satisfactory fluidizing reaction, since below three times the fluidizing reaction can not be effected smoothly. The selection of 30 to 80 degrees of the taper of the intermediate portion is due to the fact that at above 80° there occurs between the intermediate portion and fixed reaction bed a vacant space not pertaining to the reaction and the solid particles in this portion can not be pulverized and drop into the fluidized bed at the state of original particle size, thereby considerably interrupting fluidizing reaction, and below 30° it is difficult to form the fluidizing bed.

In the operation, charcoal is charged into the reaction apparatus 3 from the hopper 4 through a conduit 5 open to the upper end of the reacting apparatus. The height of the charcoal in the reacting apparatus should be at least greater than the average diameter of the fixed reaction bed. If the height is lower than that it is not only disadvantageous as the unreacted sulfur rising through the fluidizing bed can not be sufficiently caught, but also the powder flowing in the fluidized bed can not be sufficiently repressed. On the other hand, the sulfur to react with charcoal is heated to a temperature of 800 to 900° C. in a superheater 6 and is delivered through a pipe 7 into the lower part of the fluidizing bed. When the reaction apparatus is cylindrical, the inlet opening of gaseous sulfur may be in a direction normal to the cylindrical cross section of the apparatus but if it is arranged in the direction tangential to the cylindrical cross section as shown in FIG. 2 an eddy current is caused in the fluidized bed to make the fluidizing reaction very effective.

According to the invention, the temperature of the charcoal bed is maintained, without heating it from the outside, by introducing the gaseous sulfur heated to a temperature above 800° C. When charcoal is used the temperature of gaseous sulfur may sometimes be raised up to 900° C. due to the poorer reactivity. If, however, the temperature is raised higher than 900° C. there might occur partially in the interior of the charcoal bed the high temperature portion above 1,000° C. wherein ash may sometimes be fused and accumulates to form a large mass and to make the operation difficult. By the reaction of thus introduced gaseous sulfur with charcoal the latter becomes gradually fine powder and the pulverized charcoal advances gradually to the lower part of the reaction apparatus so as to form the fluidized bed. The introduced gaseous sulfur reacts at first with the pulverized charcoal in the fluidizing bed, while the unreacted gaseous sulfur reacts successively with the charcoal in the upper fixed bed so that the sulfur is perfectly reacted without loss.

Better efficiency can be obtained by keeping the flowing speed of gaseous sulfur in the fluidizing bed to 0.5 to 2 m./sec., whilst outside of this speed range there occurs no fluidizing reaction or results in a non-homogeneous reaction to lower the yield of carbon disulfide and favorable results can never be obtained.

The carbon disulfide thus produced is taken out through a tube 13 from the upper part of the fixed reaction bed and the fine powder of charcoal intermingled is removed by means of a cyclone separator 14 and discharged through the valve 15. The product taken out through pipe 16 is cooled to provide raw carbon disulfide. The ashes of charcoal deposit and collect in the bottom 8 of the fluidized bed, from which the ashes are taken out by means of a revolving screw 9 into an ash pit 11 by opening the valve 10. Then after closing the valve 10 to prevent the flowing out of the gas the ashes are taken out of the ash pit 11 by opening its cover 12. The positions of the ash outlet opening and the gas inlet opening 7 may be at right angle to each other as shown in FIG. 3 or in alignment as shown in FIG. 4, or any other angular relation may be taken.

Furthermore, it is preferable to provide a valve 5' at middle of the fixed inlet tube 5 and also a cover 4' on top of the hopper 4 in order to prevent the escape of gas. The reaction apparatus may be of cylindrical or polygonal shape.

The distribution of charcoal particles to be used for the reaction need not be uniform, but may be of a large distribution and it is advantageous to use such charcoal having hardness not easily crushed to fine particles. Lower grade charcoal is sufficient but should be well dried by heating.

The quantity of production when the method of the invention is adopted corresponds to about 20 times as much that of a conventional retort process per unit volume of the reaction apparatus; and moreover the invention has a large commercial merit in the point that the quality and grain size of charcoal of wide range, which could not be used in a known retort process and other unimproved processes, can be utilized by the invention.

The invention will be further explained in detail by the examples which are not restrictive of the invention.

EXAMPLES 1-3

A furnace for producing carbon disulfide lined with fire bricks was charged with charcoal having different distributions of grain size and compositions from a hopper and gaseous sulfur heated to 830° C. was introduced into the reaction furnace at a rate of 420 kg./hr. under the pressure of 30 mm. Hg and at the flowing velocity of 1.0 m./sec., then the following results were obtained.

| Run No. | Distribution of charcoal particle size, percent | | | | Analyzed value, percent | | | Purified CS$_2$, kg./hr. |
|---|---|---|---|---|---|---|---|---|
| | Above 10 mm. | 5-10 mm. | 3-5 mm. | Below 3 mm. | Volatile matter | Fixed carbon | Ashes | |
| 1 | 64.0 | 14.8 | 6.9 | 14.3 | 5.42 | 92.58 | 2.00 | 425 |
| 2 | 50.0 | 29.3 | 7.2 | 13.5 | 6.02 | 84.16 | 9.82 | 418 |
| 3 | 43.2 | 25.5 | 9.5 | 21.8 | 5.94 | 79.60 | 14.46 | 408 |

What I claim is:
1. A method of continuous production of carbon disulfide by reacting charcoal with gaseous sulfur which comprises introducing charcoal, more than half of which has a size of more than 10 mm., in a reaction apparatus comprising an upper fixed reaction bed and a lower fluidized reaction bed through an opening in the reaction apparatus in such an amount that the height of the charcoal in the fixed reaction bed is greater than the average diameter of said fixed reaction bed, the cross sectional area of said fixed reaction bed being more than three times that of the fluidized reaction bed, feeding gaseous sulfur heated to a temperature of 800° to 900° C. and having a rate of gas flow of 0.5 to 2.0 m./sec. to the lower part of the fluidized reaction bed to maintain fine particles of charcoal in a fluidized state and react with these particles and then with granular charcoal in the fixed reaction bed, taking out the resulting carbon disulfide continuously from the upper part of said fixed reaction bed and removing the produced ash from the lower end of said fluidized reaction bed.

References Cited
UNITED STATES PATENTS

| | | | |
|---|---|---|---|
| 1,687,118 | 10/1928 | Winkler | 48—206 |
| 1,857,799 | 5/1932 | Winkler | 48—206 |
| 2,480,639 | 8/1949 | Ferguson | 23—206 |

OSCAR R. VERTIZ, *Primary Examiner.*

G. T. OZAKI, *Assistant Examiner.*